United States Patent
Mai

(10) Patent No.: US 7,224,419 B2
(45) Date of Patent: May 29, 2007

(54) LIQUID CRYSTAL DISPLAY DEVICE

(75) Inventor: Che-Kuei Mai, Hsinchu (TW)

(73) Assignee: TPO Displays Corp., Chu-Nan (TW)

( * ) Notice: Subject to any disclaimer, the term of this patent is extended or adjusted under 35 U.S.C. 154(b) by 27 days.

(21) Appl. No.: 10/641,259

(22) Filed: Aug. 13, 2003

(65) Prior Publication Data

US 2005/0036087 A1 Feb. 17, 2005

(51) Int. Cl.
*G02F 1/1333* (2006.01)
*G02F 1/1343* (2006.01)

(52) U.S. Cl. ...................... 349/110; 349/139
(58) Field of Classification Search ............... 349/104, 349/105, 110, 138–139
See application file for complete search history.

(56) References Cited

U.S. PATENT DOCUMENTS 5,844,255 A * 12/1998 Suzuki et al. ................ 257/59
6,218,679 B1 * 4/2001 Takahara et al. ............. 257/59
6,897,919 B2 * 5/2005 Enomoto et al. ........... 349/106

* cited by examiner

*Primary Examiner*—Dung T. Nguyen
(74) *Attorney, Agent, or Firm*—Liu & Liu

(57) ABSTRACT

The present invention provides a liquid crystal display device to protect device users from EMI coming from the liquid crystal display panel. The liquid crystal display device of the present invention comprises: a first substrate, wherein the substrate has a black matrix; a second substrate; a liquid crystal layer between the first substrate and the second substrate; and a first electro-magnetic interference shield layer on the first substrate, wherein the position of the first electro-magnetic interference shield layer corresponds to the position of the black matrix.

9 Claims, 6 Drawing Sheets

LIQUID CRYSTAL DISPLAY DEVICE

BACKGROUND OF THE INVENTION

1. Field of the Invention

This invention generally relates to a liquid crystal display device, and more particularly to a liquid crystal display device, which can protect device users from electro-magnetic interference ("EMI").

2. Description of Related Art

Liquid crystal display (LCD) panel has been widely used because of its lightweight, compact size, low power consumption, and low voltage operation. However, for those electronic products that use LCD modules such as notebook computers or LCD monitors, the existing EMI shield can only be positioned on the LCD panel casing. But EMI shield cannot be positioned on the surface of the LCD panels even though the LCD panel is the one of the major sources of the EMI when the users use the computers. Hence, the existing EMI shield for LCD device cannot effectively protect the users of such device from EMI.

SUMMARY OF THE INVENTION

An object of the present invention is to provide a LCD device to protect device users from EMI.

The present invention provides a liquid crystal display device, comprising: a first substrate, wherein the substrate has a black matrix; a second substrate; a liquid crystal layer between the first substrate and the second substrate; and a first electro-magnetic interference shield layer on the first substrate, wherein the position of the first electro-magnetic interference shield layer corresponds to the position of the black matrix.

The present invention also provides another liquid crystal display device, comprising: a first substrate; a second substrate, wherein the substrate has a black matrix; a liquid crystal layer between the first substrate and the second substrate; and a first electro-magnetic interference shield layer on the first substrate, wherein the position of the first electro-magnetic interference shield layer corresponds to the position of the black matrix.

In another embodiment of the present invention, the liquid crystal display device further comprises a second electro-magnetic interference shield layer on the first substrate covering the first electro-magnetic interference shield layer, wherein the material of the second electro-magnetic interference shield layer is a transparent material.

In another embodiment of the present invention, the liquid crystal display device further comprises a second electro-magnetic interference shield layer on the first substrate and position between the first electro-magnetic interference shield layer, wherein the material of the second electro-magnetic interference shield layer is a transparent material.

In another embodiment of the present invention, the liquid crystal display device further comprises a third electro-magnetic interference shield layer on the second substrate, wherein the position of the third electro-magnetic interference shield layer corresponds to the position of the black matrix.

In another embodiment of the present invention, the liquid crystal display device further comprises a fourth electro-magnetic interference shield layer on the second substrate covering the third electro-magnetic interference shield layer, wherein the material of the fourth electro-magnetic interference shield layer is a transparent material.

In another embodiment of the present invention, the liquid crystal display device further comprises a fourth electro-magnetic interference shield layer on the second substrate and position between the third electro-magnetic interference shield layer, wherein the material of the fourth electro-magnetic interference shield layer is a transparent material.

Accordingly, the liquid crystal display device of the present invention has at least an electro-magnetic interference shield layer. The position of the electro-magnetic interference shield layer corresponds to the non-transparent area (black matrix). Hence, the electro-magnetic interference shield layer can prevent human body from EMI without affecting the transmission rate of the liquid crystal display device.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE PREFERRED EMBODIMENTS

Figure 1:
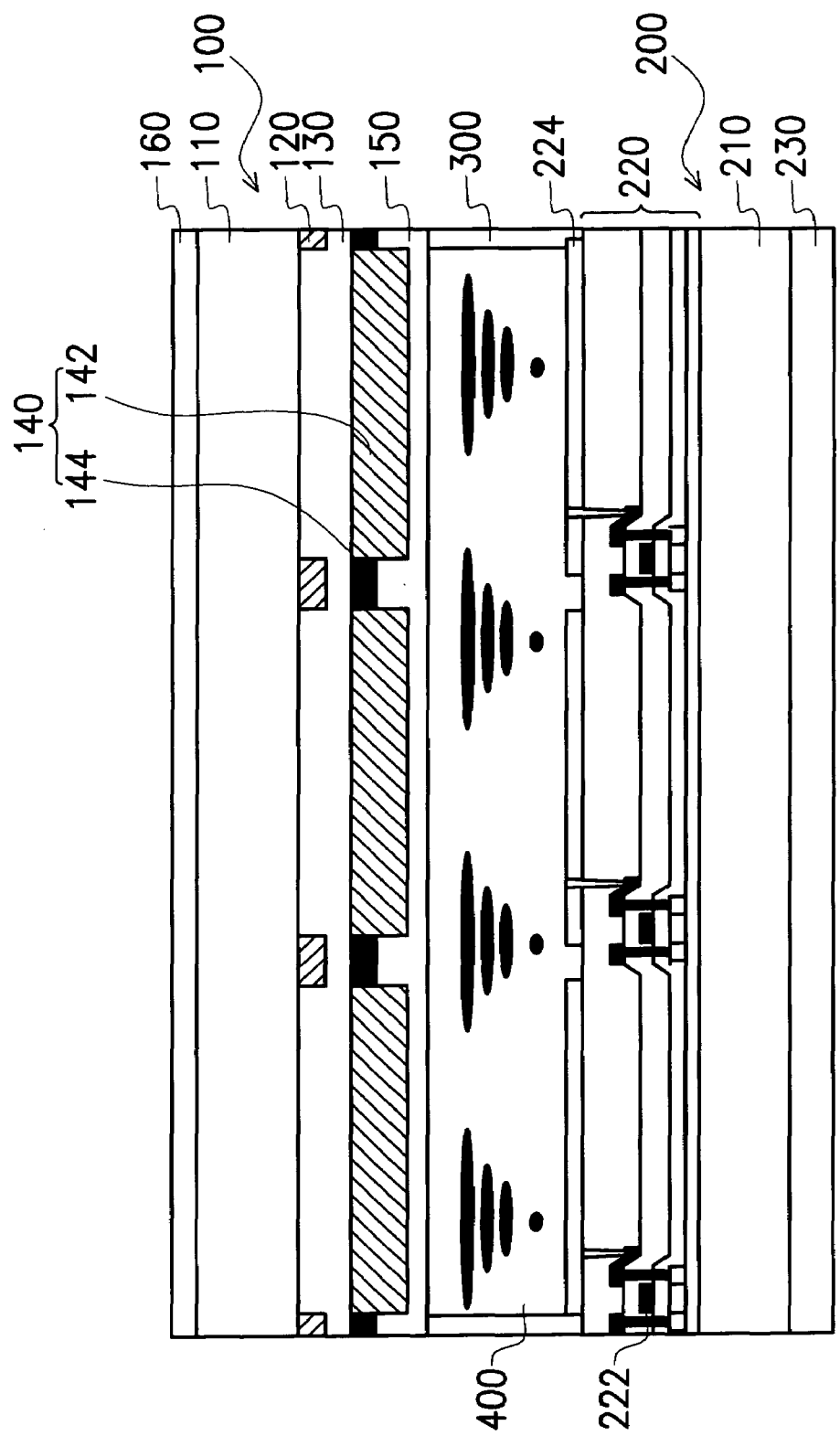
FIG. 1 is the cross-sectional view of an embodiment of a liquid crystal display device in accordance with the present invention.

FIG. 1 is the cross-sectional view of an embodiment of a liquid crystal display device in accordance with the present invention.

Referring to FIG. 1, this embodiment of the liquid crystal display device comprises a first substrate 100, a second substrate 200, a sealant 300 and a liquid crystal layer 400 between the first substrate 100, the second substrate 200, and the sealant 300.

The first substrate 100 can be a color filter substrate, which includes a substrate 100, an electro-magnetic interference shield 120, a planar layer 130, a color filter layer 140, an electrode film 150, and a polarizer 160.

Figure 5:
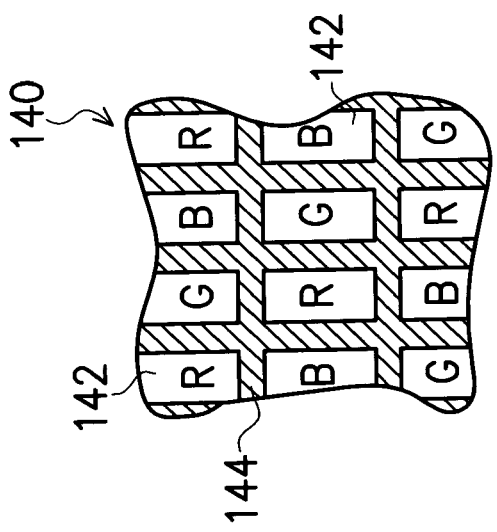
FIG. 5 is the top view of a color filter of a liquid crystal display device in accordance with an embodiment of the present invention.

The color filter 140 is positioned on the substrate 110. As shown in FIG. 5, the color filter layer 140 includes a plurality of red color filters 142, green color filters 142, or blue color filters 142. These color filters 142 are arranged in a mosaic, triangle, or strip form. There is a black matrix 144 between these color filters 142.

Figure 6:
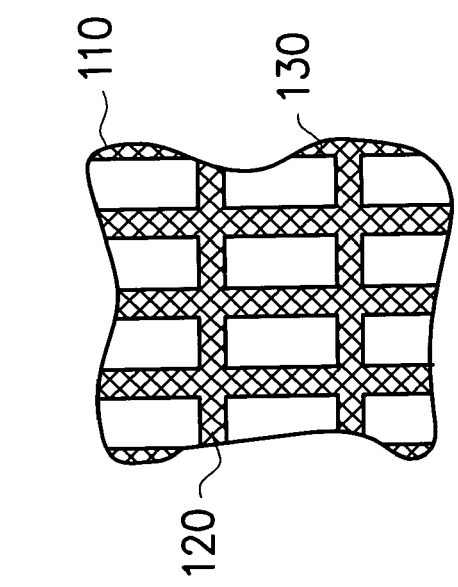
FIG. 6 is the top view of an electro-magnetic interference shield layer of a liquid crystal display device in accordance with an embodiment of the present invention.
Figure 7:
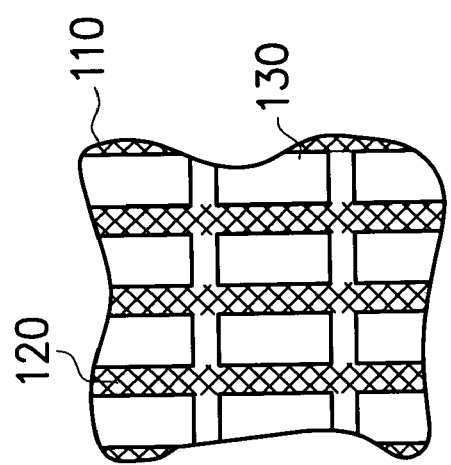
FIG. 7 is the top view of another electro-magnetic interference shield layer of a liquid crystal display device in accordance with another embodiment of the present invention.

Referring to FIG. 1, the electro-magnetic interference shield layer is positioned on the substrate 110 between the color filter layer 140 and the substrate 110 to provide EMI protection. The position of the electro-magnetic interference shield layer 120 corresponds to the position of the non-transparent area on the first substrate. In this embodiment, the position of the electro-magnetic interference shield layer 120 corresponds to the black matrix 144. For example, the electro-magnetic interference shield layer 120 can be a net form (as shown in FIG. 6) or a strip form (as shown in FIG. 7)

Because most electronic products are low-current and high-voltage radiators, the near-field radiation is from the electric field. Hence, the electro-magnetic interference shield layer 120 of the present invention uses conductive material as a shield. For example, the material of the electro-magnetic interference shield layer 120 can be a non-transparent conductive material such as metal or a transparent conductive material such as indium tin oxide ("ITO").

Referring to FIG. 1, the planar layer 130 is positioned between the color filter layer 140 and the substrate 100 and covers the electro-magnetic interference shield layer 120 to planarize the step difference caused by the presence of the electro-magnetic interference shield layer 120 so that the color filter layer 140 can be formed on a planar surface. The material of the planar layer 130 can be silicon oxide.

Referring to FIG. 1, the electrode film 150 is positioned on the color filter layer 140, wherein the material of electrode film 150 is ITO. The polarizer 160 is positioned on the other side of the substrate 110 to perform the display function.

Referring to FIG. 1, the second substrate 200 can be an array substrate including a substrate 210, an electrode layer 220, and a polarizer 230.

In this embodiment, the electrode layer 220 is a thin film transistor (TFT) array and is positioned on the substrate 210 to turn on or turn off the liquid crystal display units. The TFT array includes a plurality of thin film transistors 222 and a plurality of pixel electrode 224 corresponds to the transistor 222. The TFT array 220 is polysilicon TFT or amorphous silicon TFT. The material of the pixel electrode 224 is ITO. Each transistor 222 and the corresponding pixel electrode 224 constitute a pixel structure. Those pixel structures are arranged to form a TFT array. The polarizer 230 is positioned on the other side of the substrate 210 to perform the display function.

Referring to FIG. 1, the sealant 300 is positioned between the first substrate 100 and the second substrate 200 to from a close space. The liquid crystal layer is positioned in this close space to form the display cell.

Figure 2:
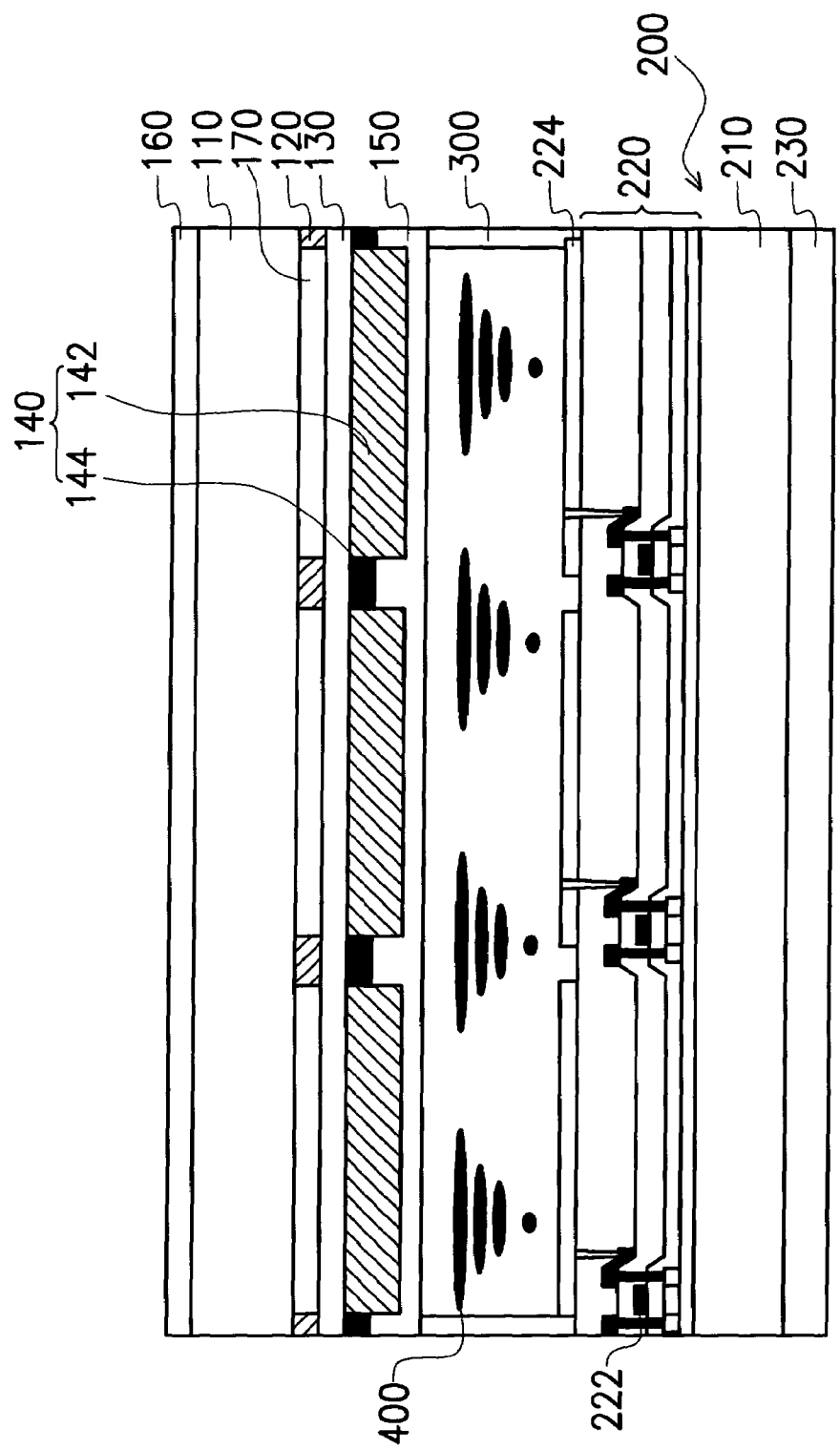
FIG. 2 is the cross-sectional view of another preferred embodiment of a liquid crystal display device in accordance with the present invention.

In addition to the structure shown in FIG. 1, the first substrate 100 of the liquid crystal device can include another electro-magnetic interference shield layer 170 (as shown in FIG. 2). Referring to FIG. 2, the electro-magnetic interference shield layer 170 is positioned between the gaps of the electro-magnetic interference shield layer 120. The planar layer 130 is positioned on the electro-magnetic interference shield layer 120 and the electro-magnetic interference shield layer 170. Then the color filter layer 140 and the electrode film 150 are positioned sequentially on the planar layer 130. The material of the electro-magnetic interference shield layer 170 can be a transparent conductive material such as ITO.

Figure 3:
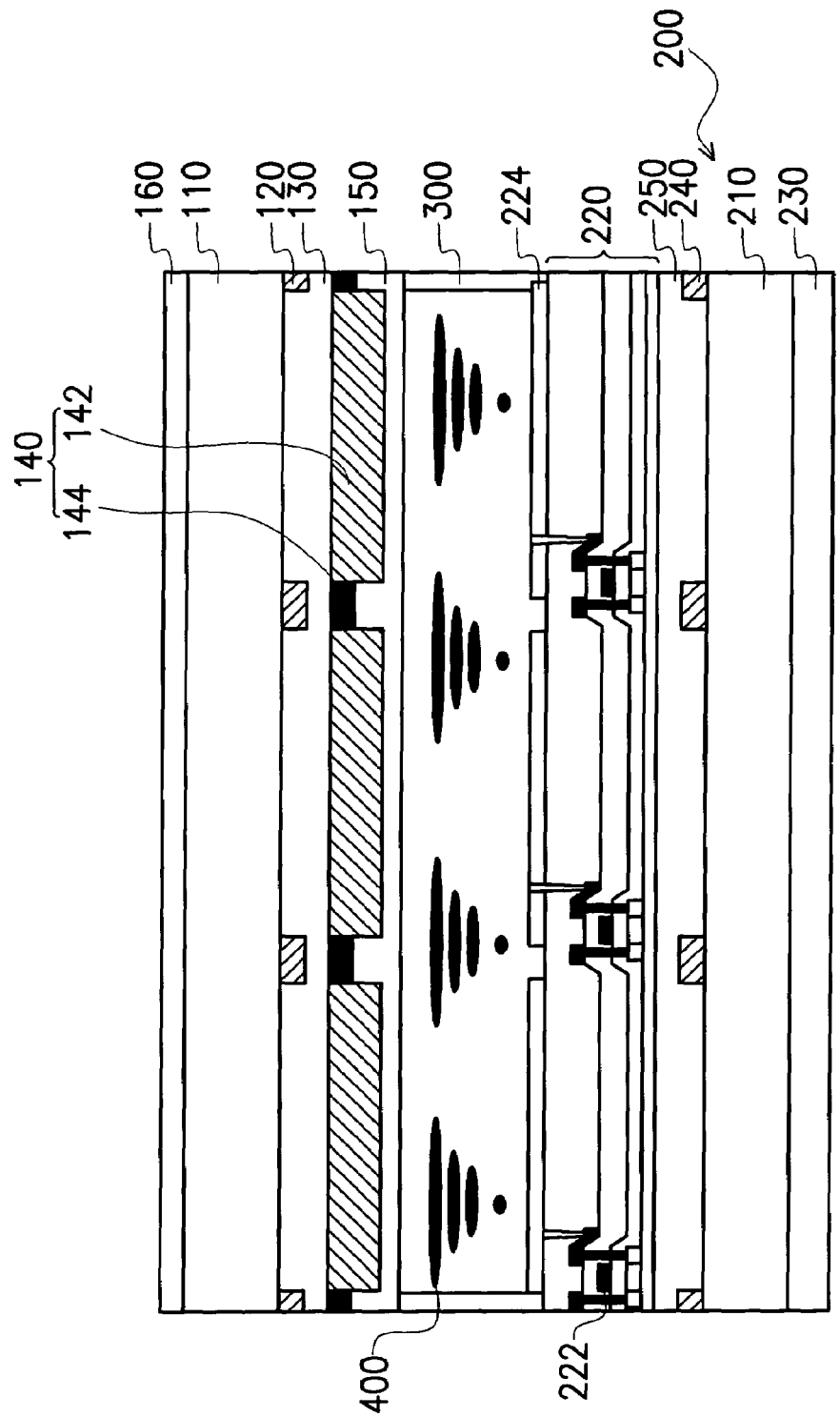
FIG. 3 is the cross-sectional view of another embodiment of a liquid crystal display device in accordance with the present invention.

Furthermore, in addition to the electro-magnetic interference shield layer 120, position in the first substrate 100, another electro-magnetic interference shield layer 240 can be positioned in the second substrate 200 (as shown in FIG. 3). Referring to FIG. 3, the electro-magnetic interference shield layer 240 and the planar 250 are positioned between the substrate 210 and the TFT array 220. The position of the electro-magnetic interference shield layer 240 corresponds to the position of the black matrix 144. For example, the electro-magnetic interference shield layer 240 can be a net form or a strip form corresponding to the black matrix 144 completely or partially. The material of the electro-magnetic interference shield layer 240 can be a non-transparent conductive material such as metal or a transparent conductive material such as indium tin oxide ("ITO").

Figure 4:
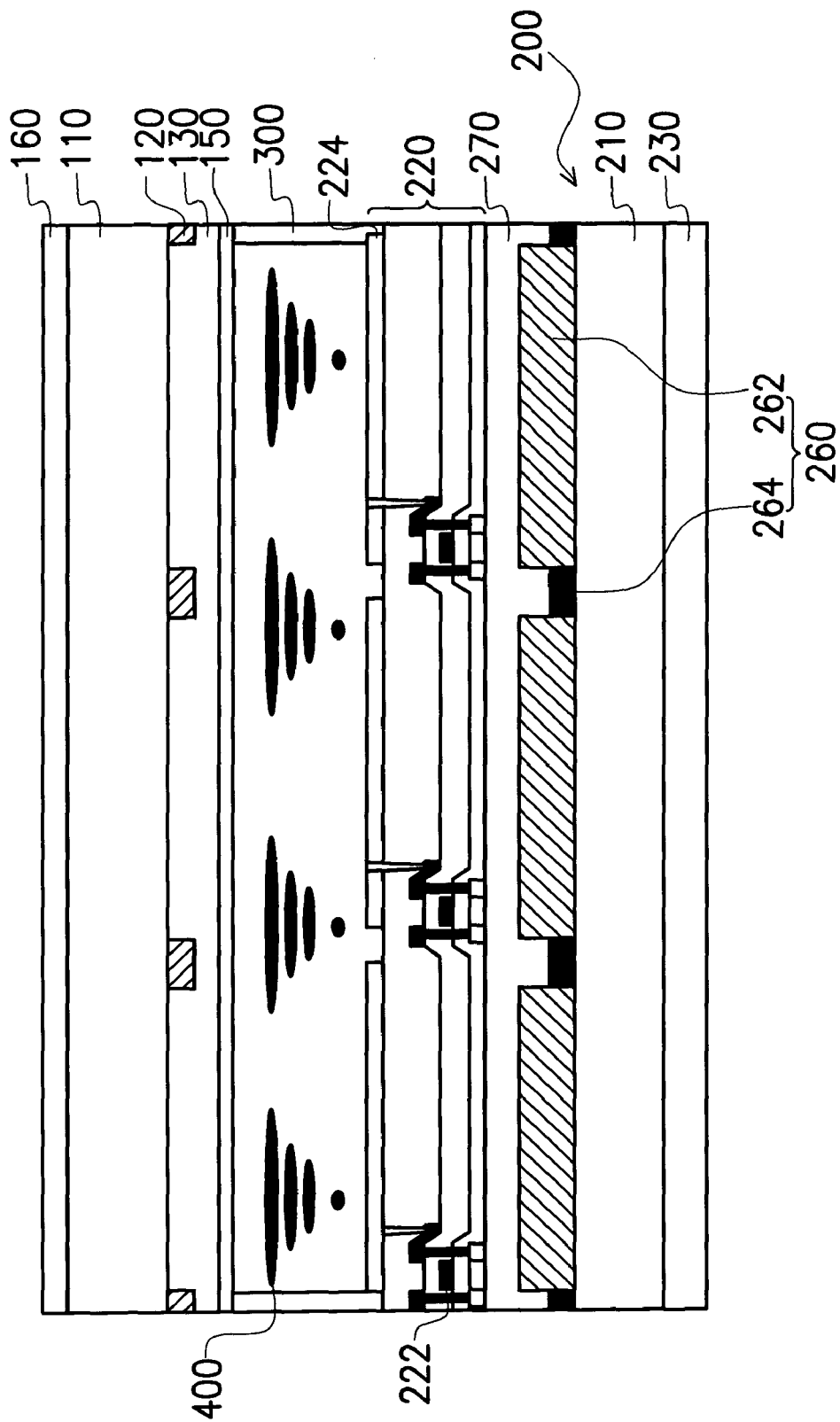
FIG. 4 is the cross-sectional view of another embodiment of a liquid crystal display device in accordance with the present invention.

Furthermore, in addition to the color filter layer 140 positions on the surface of the substrate 110, another color filter layer can also be positioned in the second substrate 200. As shown in FIG. 4, the color filter layer 260 includes a plurality of red color filters 262, green color filters 262, or blue color filters 262. These color filters 262 are arranged in a mosaic, triangle, or strip form. There is a black matrix 264 between these color filters 262.

In the above embodiments, if necessary, an alignment film (not shown in the figures) can also be positioned between the first substrate 100 and the liquid crystal layer 400, and between the second substrate 200 and the liquid crystal layer 400. One skilled in the art would know the alignment film is to align the liquid crystal molecules in a particular direction.

In the above embodiments, if necessary, a back light module (not shown in the figures) can be positioned below the polarizer 230. One skilled in the art would know the back light module is to provide the light of the liquid crystal display device.

Figure 8:
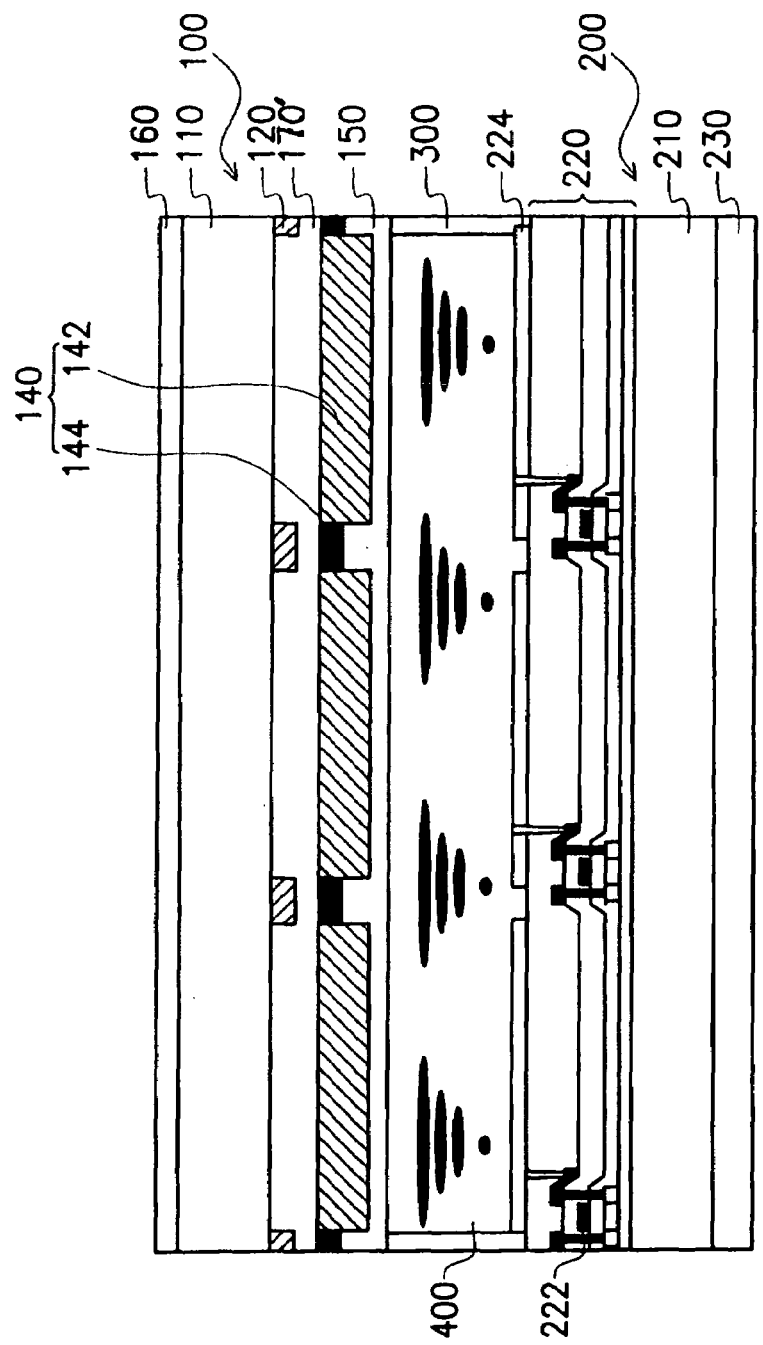
FIG. 8 is a cross sectional view of another embodiment of a liquid crystal display device in accordance with the present invention.

In the above embodiments, the electro-magnetic interference shield layer 120 is a net or strip structure corresponding to the black matrix 144, or a compound structure of the electro-magnetic interference shield layer 170 is positioned in the gap of the electro-magnetic interference shield layer 120. However, one skilled, in the art can use a planar transparent conductive material layer 170' to replace the planar layer 130 in FIG. 1 (see FIG. 8), or can position a planar transparent conductive material layer between the substrate 110 and the color filter layer 140 to replace the electro-magnetic interference shield layer 120 and the planar 130.

Hence, when the electro-magnetic interference shield layer is positioned in the first substrate 100 or the second substrate 200, the structure of the electro-magnetic interference shield layer can be any one of the above structures to be positioned in the first substrate 100 or the second substrate 200. Furthermore, when both of the first substrate 100 or the second substrate 200 have the electro-magnetic interference shield layers, the structure of each electro-magnetic interference shield layer can be any one of the above structures to be positioned in the first substrate 100 or the second substrate 200.

In the above embodiments, the transmission type LCD-TFT device is used as an example. However, the present invention also can be applied to diode array LCD device. For example, the diode device can be used to replace the thin film transistor 222 to drive the liquid crystal display device.

Furthermore, the present invention also can be applied to passive matrix LCD devices in addition to the active matrix LCD devices. For example, a strip electrode film can be used to replace the electrode film 150 in the first substrate 100 and the TFT array (electrode layer) 220 in the second substrate 200, and the extension of the electrode film 150 is perpendicular to the extension of the electrode layer 220.

The present invention can also be applied to the reflection type LCD devices. For example, a reflecting layer can be positioned between the substrate 210 and the TFT array 220 or between the strip electrode film, and a front light module is positioned on the polarizer 160 of the first substrate 100 to replace the back light module.

Accordingly, a liquid crystal display device of the present invention has at least an electro-magnetic interference shield layer. The position of the electro-magnetic interference shield layer corresponds to the non-transparent area (black matrix). The electro-magnetic interference shield layer can protect device users from EMI without affecting the transmission rate of the liquid crystal display device.

Furthermore, an electro-magnetic interference shield layer of the present invention can be widely applied to active matrix LCD devices, passive matrix LCD devices, transmission type LCD devices, reflection type LCD devices, and other LCD devices to protect device users from EMI coming from liquid crystal display panel.

The above description provides a full and complete description of the preferred embodiments of the present invention. Those skilled in the art may make various modifications, alternate construction, and equivalent without changing the scope or spirit of the invention. Accordingly, the above description and illustrations should not be construed as limiting the scope of the invention, which is defined by the following claims.

What is claimed is:

1. A liquid crystal display device, comprising:
   a first substrate;
   a second substrate comprising a thin film transistor array thereon;
   a black matrix on one of the first substrate and the second substrate;
   a color filter between the black matrix;
   a liquid crystal layer between the first substrate and the second substrate;
   a patterned first electro-magnetic interference shield layer on the first substrate and exposing a portion of the first substrate, wherein the position of the first electro-magnetic interference shield layer corresponds to the position of the black matrix, and the patterned first electro-magnetic interference shield layer is a conductive material and not electrically connected to the thin film transistor array, and wherein the material of the first electro-magnetic interference shield layer is selected from the group consisting of non-transparent materials and transparent materials; and
   a second electro-magnetic interference shield layer on the first substrate covering the first electro-magnetic interference shield layer, wherein the material of the second electro-magnetic interference shield layer is a transparent material.

2. A liquid crystal display device, comprising:
   a first substrate;
   a second substrate comprising a thin film transistor array thereon;
   a black matrix on one of the first substrate and the second substrate;
   a color filter between the black matrix;
   a liquid crystal layer between the first substrate and the second substrate;
   a patterned first electro-magnetic interference shield layer on the first substrate and exposing a portion of the first substrate, wherein the position of the first electro-magnetic interference shield layer corresponds to the position of the black matrix, wherein the patterned first electro-magnetic interference shield layer is a conductive material and not electrically connected to the thin film transistor array, and wherein the material of the first electro-magnetic interference shield layer is selected from the group consisting of non-transparent materials and transparent materials; and
   a second electro-magnetic interference shield layer on the exposed portion of the first substrate, wherein the material of the second electro-magnetic interference shield layer is a transparent material.

3. The liquid crystal display device of claim 2, wherein the patterned first electro-magnetic interference shield layer is formed on a non-transparent area on the first substrate.

4. The liquid crystal display device of claim 2, further comprising a planar layer formed on the patterned first electro-magnetic interference shield layer.

5. The liquid crystal display device of claim 2, wherein the patterned first electro-magnetic interference shield layer is formed in a net form or a strip form.

6. A liquid crystal display device, comprising:
   a first substrate;
   a second substrate comprising a thin film transistor array thereon;
   a black matrix on one of the first substrate and the second substrate;
   a color filter between the black matrix;
   a liquid crystal layer between the first substrate and the second substrate;
   a patterned first electro-magnetic interference shield layer on the first substrate and exposing a portion of the first substrate, wherein the position of the first electro-magnetic interference shield layer corresponds to the position of the black matrix, and wherein the patterned first electro-magnetic interference shield layer is a conductive material and not electrically connected to the thin film transistor array; and
   a patterned third electro-magnetic interference shield layer on the second substrate and exposing a portion of the second substrate, wherein the position of the third electro-magnetic interference shield layer corresponds to the position of the black matrix.

7. The liquid crystal display device of claim 6, wherein the material of the third electro-magnetic interference shield layer is selected from the group consisting of non-transparent materials and transparent materials.

8. The liquid crystal display device of claim 7, further comprising a fourth electro-magnetic interference shield layer on the second substrate covering the third electro-magnetic interference shield layer, wherein the material of the fourth electro-magnetic interference shield layer is a transparent material.

9. The liquid crystal display device of claim 7, further comprising a fourth electro-magnetic interference shield layer on the exposed portion of the second substrate, wherein the material of the fourth electro-magnetic interference shield layer is a transparent material.

* * * * *